(12) United States Patent
Kanade et al.

(10) Patent No.: US 8,998,477 B2
(45) Date of Patent: Apr. 7, 2015

(54) APPARATUS FOR PROVIDING A LIGHT SOURCE IN THE FORM OF A SURFACE THAT ALLOWS ALMOST ALL EXTERNAL LIGHT TO PASS THROUGH WITHOUT BEING DISPERSED

(75) Inventors: Udayan Kanade, Pune (IN); Balaji Ganapathy, Pune (IN)

(73) Assignee: I2iC Corporation, Foster City, CA (US)

( * ) Notice: Subject to any disclaimer, the term of this patent is extended or adjusted under 35 U.S.C. 154(b) by 455 days.

(21) Appl. No.: 11/549,808

(22) Filed: Oct. 16, 2006

(65) Prior Publication Data
US 2007/0086176 A1   Apr. 19, 2007

(30) Foreign Application Priority Data
Oct. 17, 2005 (IN) .......................... 1299/MUM/2005

(51) Int. Cl.
*F21V 7/22* (2006.01)
*G03B 15/02* (2006.01)
*F21V 8/00* (2006.01)

(52) U.S. Cl.
CPC .............. *G03B 15/02* (2013.01); *G02B 6/0041* (2013.01); *G02B 6/0061* (2013.01); *G02B 6/0071* (2013.01)

(58) Field of Classification Search
USPC ........................... 362/615, 618–619, 600, 629
See application file for complete search history.

(56) References Cited

U.S. PATENT DOCUMENTS

| | | | | |
|---|---|---|---|---|
| 3,356,839 A | * | 12/1967 | Mineo et al. | 362/604 |
| 5,649,754 A | * | 7/1997 | Matsumoto | 362/618 |
| 5,899,552 A | * | 5/1999 | Yokoyama et al. | 362/619 |
| 5,934,779 A | | 8/1999 | Leidig | |
| 5,966,192 A | | 10/1999 | Higuchi et al. | |
| 6,361,180 B1 | | 3/2002 | Imura | |
| 6,447,133 B1 | * | 9/2002 | Eschke et al. | 362/629 |
| 6,447,134 B1 | * | 9/2002 | Takahashi et al. | 362/618 |
| 6,853,799 B2 | | 2/2005 | Sung et al. | |
| 6,875,499 B1 | | 4/2005 | De Toffol et al. | |
| 7,084,937 B2 | | 8/2006 | Yu et al. | |
| 7,218,824 B2 | * | 5/2007 | Franklin et al. | 385/125 |
| 2002/0051356 A1 | * | 5/2002 | Takahashi et al. | 362/31 |
| 2002/0105793 A1 | * | 8/2002 | Oda et al. | 362/31 |
| 2005/0046768 A1 | | 3/2005 | Wu | |
| 2005/0052402 A1 | | 3/2005 | Kitano et al. | |

FOREIGN PATENT DOCUMENTS

EP       571173 A2  * 11/1993
WO   WO 2004/027474 A1    4/2004

OTHER PUBLICATIONS

PCT US06/40573, WIPO—PCT Search Report, Dec. 3, 2007.

* cited by examiner

*Primary Examiner* — Robert May

(57) ABSTRACT

An apparatus and method for providing a light source in the form of a surface are disclosed. In one embodiment, the apparatus comprises a first sheet including a light diffuser, and a light source placed along an edge of the first sheet. The first sheet diffuses light generated by the light source, wherein the distribution of light diffusing particles is varied throughout the light diffuser to emanate a predetermined light pattern.

2 Claims, 6 Drawing Sheets

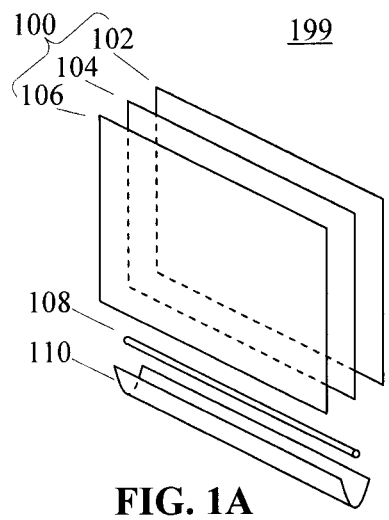
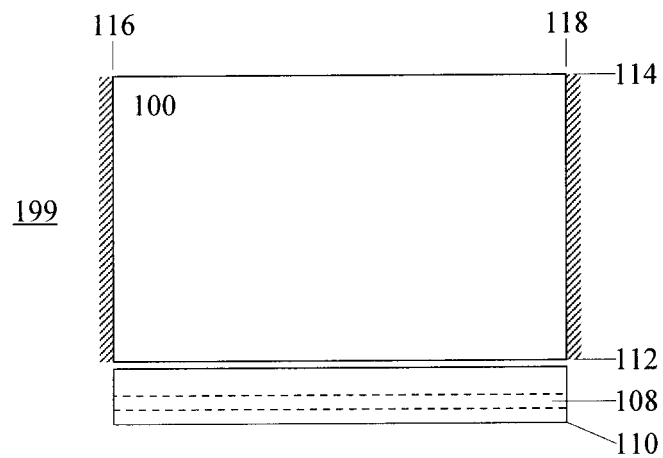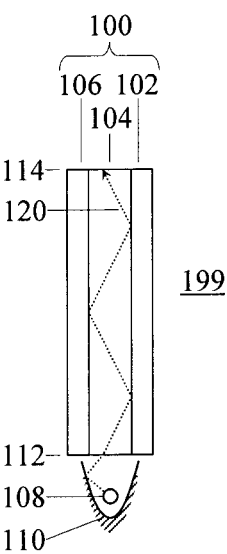
FIG. 1A
FIG. 1B
FIG. 1C

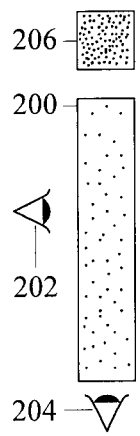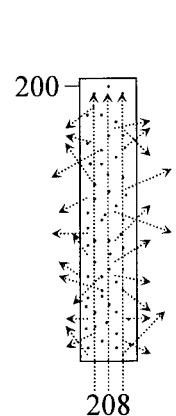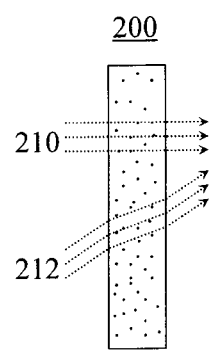
FIG. 2A  FIG. 2B  FIG. 2C
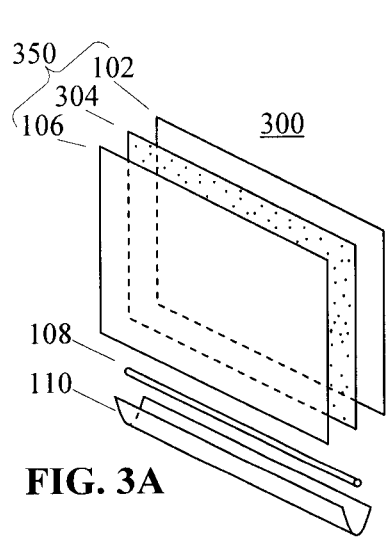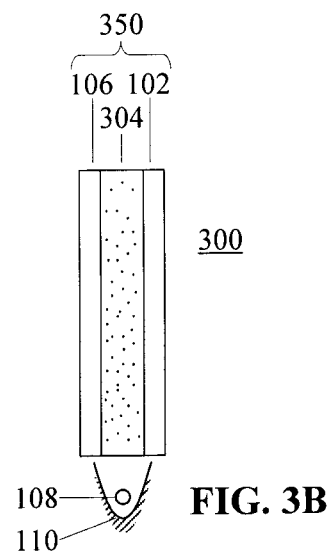
FIG. 3A  FIG. 3B
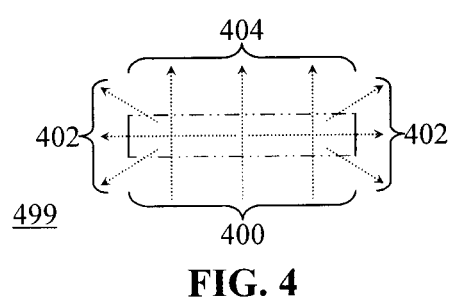
FIG. 4

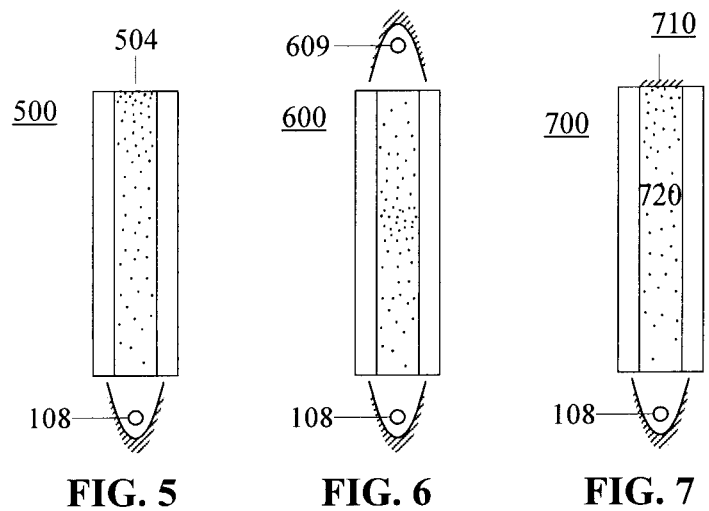

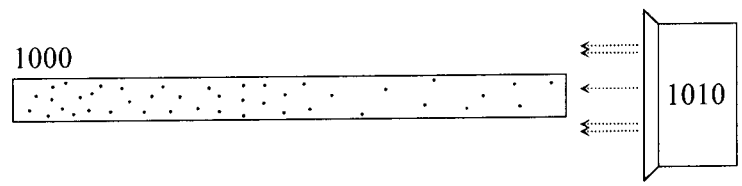
FIG. 10
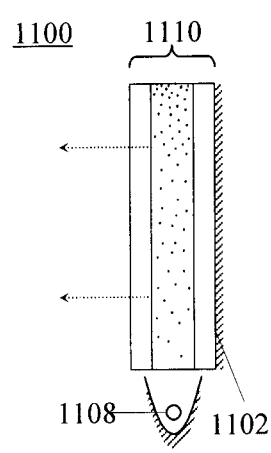 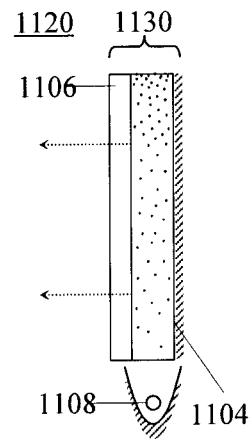 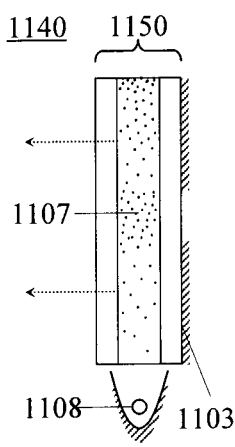
FIG. 11A    FIG. 11B    FIG. 11C
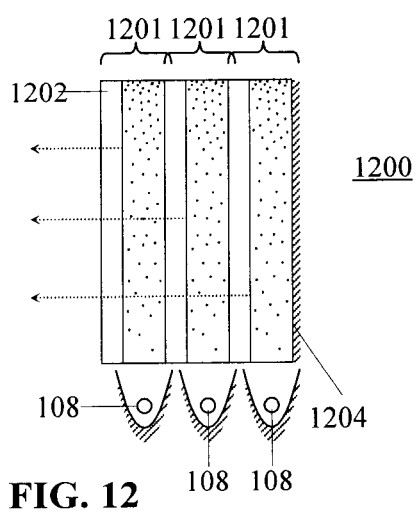
FIG. 12

APPARATUS FOR PROVIDING A LIGHT SOURCE IN THE FORM OF A SURFACE THAT ALLOWS ALMOST ALL EXTERNAL LIGHT TO PASS THROUGH WITHOUT BEING DISPERSED

The present application claims the benefit of and priority to Indian Provisional Patent Application No. 1299/MUM/2005 entitled "Transparent Light Source in the Form of a Surface" and filed on Oct. 17, 2005.

FIELD OF INVENTION

The present invention relates to an illumination system. Particularly, the invention relates to an apparatus and method for providing a light source in the form of a surface.

BACKGROUND

Illumination is used to light objects for seeing, as also for photography, microscopy, scientific purposes, entertainment productions (including theatre, television and movies), projection of images and as backlights of displays.

For illumination purposes, the present art has many systems in the form of point or single dimensional sources of light. Such systems have many drawbacks: light intensity is very high at the light source compared to the rest of the room or environment, and thus such light sources are hurtful to the eye. Such sources also cast very sharp shadows of objects, which are not pleasing to the eye, and may not be preferred for applications such as photography and entertainment production. Such sources also cause glare on surfaces such as table tops, television front panels and monitor front panels.

There are prior systems that act as light sources in the form of a surface. Fluorescent lights for home lighting may be covered by diffuser panels to reduce the glare. These systems are bulky. They are also not transparent. Diffusers and diffuse reflectors such as umbrella reflectors are used as light sources for photography and cinematography, but they are only approximations to uniform lighting.

Backlights of flat-panel screens such as LCD screens provide uniform or almost uniform light. Prior solutions for backlighting an LCD screen is to have a light guide in the form of a sheet, with some shapes such as dots or prisms printed on it to extract light. The light guide is formed by sandwiching a high refractive index material between two low refractive index materials. The shape and frequency of dots is managed such that uniform illumination over the surface is achieved. Uniformly illuminating a single-dimensional light source, not a surface. These methods give uniform illumination over the surface, but the illumination is not uniform locally—when looked at closely the appearance is that of dots of glowing light surrounded by darkness. Such non-uniformity is not pleasing to the eye, and will cause disturbing Moiré patterns if used as a backlight for a flat panel screen. Such systems, to achieve local uniformity of light, need to be covered by diffuser panels or film, which makes them costlier, bulkier and non-transparent.

There are systems which provide uniform illumination over a surface in the local sense, i.e. locally, a surface is uniformly illuminated. These systems are similar to the systems described above, in the sense that they use a light guide and a method of extracting part of the light being guided. The light extraction, though, is not done with dots or geometric shapes, but with microscopic light scattering, diffracting or diffusing particles. Such particles are distributed uniformly throughout the light guide. This causes a continuously lighted light source, rather than one that is discretely lighted.

On the other hand, as the light is guided from one end of the sheet to another, part of the light is extracted, causing lesser and lesser light left for extracting, and thus lesser and lesser illumination. Thus, these systems do not provide uniformity of illumination over the entire surface. To provide approximate uniformity, the total drop in light from one end of the light guide to the other should not be too large. This, though, will cause light to be wasted at the edge of the light guide, and thus the energy efficiency of the system goes down.

SUMMARY

An apparatus and method for providing a light source in the form of a surface are disclosed. In one embodiment, the apparatus comprises a first sheet including a light diffuser, and a light source placed along an edge of the first sheet. The first sheet diffuses light generated by the light source, wherein the distribution of light diffusing particles is varied throughout the light diffuser to emanate a predetermined light pattern.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 1A illustrates a block diagram of an exemplary light guide, according to one embodiment of the present invention;

FIG. 1B illustrates a block diagram of an exemplary light guide as viewed from the front, according to one embodiment of the present invention;

FIG. 1C illustrates a block diagram of an exemplary light guide as viewed from the side, according to one embodiment of the present invention;

FIG. 2A illustrates a block diagram of an exemplary core, according to one embodiment of the present invention;

FIG. 2B illustrates a block diagram of exemplary core diffusing light rays 208, according to one embodiment of the present invention;

FIG. 2C illustrates a block diagram of exemplary core diffusing transverse light rays 210 and 212, according to one embodiment of the present invention;

FIG. 3A illustrates a block diagram of an exemplary light guide, according to another embodiment of the present invention;

FIG. 3B illustrates a block diagram of an exemplary light guide as viewed from the side, according to an embodiment of the present invention;

FIG. 4 illustrates a block diagram of an exemplary core element of a core, according to one embodiment of the present invention;

FIG. 5 illustrates a diagram of an exemplary light guide with a core having a varied concentration of diffuser particles, according to one embodiment of the present invention;

FIG. 6 illustrates a block diagram of an exemplary light guide having two primary light sources, according to one embodiment of the present invention;

FIG. 7 illustrates a diagram of an exemplary light guide having a mirrored core, according to one embodiment of the present invention;

FIG. 10 illustrates a block diagram of an exemplary base liquid with a light source, according to one embodiment of the present invention;

FIG. 11A illustrates a block diagram of an exemplary light guide that emanates light from a single surface, according to one embodiment of the present invention;

FIG. 11B illustrates a block diagram of an exemplary light guide that emanates light from a single surface, according to another embodiment of the present invention;

FIG. 11C illustrates a block diagram of an exemplary light guide, with a horizontal strip left unmirrored, according to one embodiment of the present invention; and FIG. 12 illustrates a light guide that allows illumination with more than two colors, according to one embodiment of the present invention.

DETAILED DESCRIPTION

Figure 8:
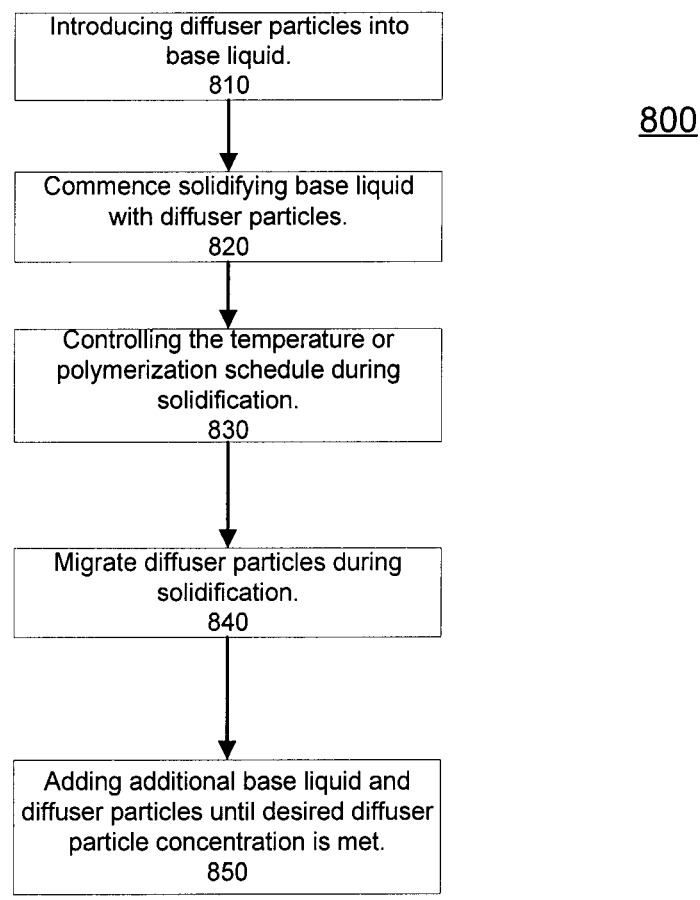
FIG. 8 is a flow diagram illustrating an exemplary core manufacturing process, according to one embodiment of the present invention.

An apparatus and method for providing a light source in the form of a surface are disclosed. In one embodiment, the apparatus comprises a first sheet including a light diffuser, and a light source placed along an edge of the first sheet. The first sheet diffuses light generated by the light source, wherein the distribution of light diffusing particles is varied throughout the light diffuser to emanate a predetermined light pattern.

According to one embodiment an energy efficient illumination system is provided by which a planar surface is made to emanate uniform illumination in a local sense as well as over a whole surface. The system comprises a light guide and primary light source, wherein the primary light source is provided in a manner that a maximum amount of light is directed into the light guide. The light guide is fashioned as a sheet of transparent material sandwiched between a plurality of sheets of transparent material of predetermined lower refractive index. The central sheet includes microscopic light diffusing, dispersing and/or diffracting materials such as powders, dyes, transparent bubbles, etc. The diffusing materials are of a light concentration so as to disperse only a small fraction of light entering one of the large faces of the surface. The concentration varies with location on the sheet so as to achieve uniform illumination over the surface of the light source, or illumination in the desired pattern.

According to another embodiment, a method of manufacturing a transparent sheet with specified non-uniform concentration of light diffusing materials comprises introducing light diffusing material at a homogeneous or varying concentration into fluid material. Solidification (in a controlled way) of the fluid material into a transparent material occurs. The light defusing material undergoes migration due to physical diffusion, buoyant force, convection and/or non-uniform diffusion rates.

FIG. 1A illustrates a block diagram of an exemplary light guide and light source system 199, according to one embodiment of the present invention. Light guide 100 is a transparent sheet. Light guide 100 is made up of three sheets joined at their larger faces, each one transparent to light. The central sheet 104 (core) being of higher refractive index than the two side sheets 102 and 106 (henceforth referred to as the cladding or cladding sheets 102, 106). Near one edge 112 of the light guide, a tube-form or linear primary light source 108 is placed. The primary light source 108 may be an incandescent filament, a fluorescent or gas discharge tube, or a bank of LEDs, or any other similar light source. The light from the primary light source 108 is coupled into the core 104 of the light guide 100 using a focusing reflector 110 or other optical arrangement, such that a maximum amount of light generated by the primary light source 108 enters the core 104 from a bottom edge. The light from the primary light source 108 undergoes repeated total internal reflection to travel from the primary light source edge 112 to the opposite edge 114 of the core.

FIG. 1B illustrates a block diagram of an exemplary light guide and light source system 199 as viewed from the front, according to one embodiment of the present invention. Light guide 100 has a top edge 114, bottom edge 112, left edge 116, and right edge 118. Left edge 116 and right edge 118 (that are perpendicular to the primary light source/bottom edge 112) are preferably mirrored so that light is not lost at these edges.

FIG. 1C illustrates a block diagram of an exemplary light guide and light source system 199 as viewed from the side, according to one embodiment of the present invention. FIG. 1C illustrates a single ray 120 of light from primary light source 108 undergoing total internal reflection.

The lower refractive index cladding sheets are used so that the core conducts the light entering its edge. The cladding sheets could be a solid, liquid, gas (such as air) or vacuum of a lower refractive index than that of the core 104. Similarly, focusing the light from the primary light source 108 such that light primarily travels through the core 104 to the other end achieves similar results, namely light being conducted by the core 104. In particular, coherent light such as that produced by a laser is conducted through the core 104 without loss. The light traveling through core 104 is extracted in small quantities at all locations of the core 104. The general principle according to which this is done is described henceforth.

FIG. 2A illustrates a block diagram of an exemplary core 200, according to one embodiment of the present invention. Although described as a sheet, core 200 is depicted as rectangular in shape for illustrative purposes. A rectangular parallelepiped sheet (core) 200 made of transparent material is shown with a very small concentration of light dispersing particles. The concentration of light dispersing particles is so small that if the sheet 200 is viewed along its narrow dimension, as depicted by the eye 202, it seems almost completely transparent. When viewed along its longer dimension, as depicted by the eye 204, a much larger visual concentration of the light dispersing particles is observed, as depicted in 206. From the general viewing direction of 204, almost any viewing direction hits a light dispersing particle, while from the general viewing direction of 202, almost no viewing direction hits a light dispersing particle.

FIG. 2B illustrates a block diagram of exemplary core 200 diffusing light rays 208, according to one embodiment of the present invention. Light rays 208 are directed into sheet 200 such that it traverses the longer length of sheet 200. Light 208 is almost completely dispersed.

FIG. 2C illustrates a block diagram of exemplary core 200 diffusing transverse light rays 210 and 212, according to one embodiment of the present invention. Light sent into sheet 200 in a transverse direction (i.e. into a large face of sheet 200) such as light rays 210 or light rays 212 are almost completely passed through the core 200 without dispersion i.e. without a change in the direction of propagation. The light that is not dispersed travels as if traveling through a purely transparent sheet, thus producing a primarily clear image at one end of the sheet of the objects at the other end. Thus core 200 is both transparent as well as clear when viewed through its larger dimension.

In one embodiment, light dispersing particles are small and homogeneously (though not necessarily uniformly) distributed throughout sheet 200.

FIG. 3A illustrates a block diagram of a light source in the form of a surface 300, according to one embodiment of the present invention. Core 304 of light guide 350 includes diffuser 340, which is a sparse distribution of light dispersing particles. The diffuser in core 304 is made of metallic, organic, or other powder or pigment, which reflects light incident on it. Alternately, diffuser in core 304 may be constituted of small transparent particles or bubbles, which disperse light by refraction, reflection at the boundary, by diffusion inside the particle, or by total internal reflection. The light from the primary light source 108 is dispersed over the entire surface of the light guide 350, and will exit both its large faces. Light guide 350 is primarily transparent and clear when viewed from one of its faces. Light is focused using a focusing reflector 110.

FIG. 3B illustrates a block diagram of a light guide 300 as viewed from the side, according to an embodiment of the present invention. A diffuser in core 304 may be constituted of small transparent particles or bubbles, which disperse light by refraction, reflection at the boundary, by diffusion inside the particle, or by total internal reflection. The light from the primary light source 108 is dispersed over the entire surface of the light guide 300, and will exit both its large faces. Light guide 300 is primarily transparent and clear when viewed from one of its faces. Light is focused using a focusing reflector 110.

FIG. 4 illustrates a block diagram of an exemplary core element 499 of a core, according to one embodiment of the present invention. Core element 499 has the thickness and breadth of the core, but has a very small height. Light 400 enters core element 499. Some of the light gets dispersed and leaves the light guide as illumination light 402, and the remaining light 404 travels on to the next core element. The power of the light going in 400 is matched by the sum of the powers of the dispersed light 402 and the light continuing to the next element 404. The fraction of light dispersed 404 with respect to the light 400 entering the core element 499 is the photic dispersivity of core element 499. The photic dispersivity of core element 499 is in direct proportion to the height of core element 499. The ratio of the photic dispersivity of core element 499 to the height of core element 499 is a photic dispersion density. As the height of core element 499 decreases, the photic dispersion density approaches a constant. This photic dispersion density of core element 499 bears a certain relationship to the diffuser concentration at the core element 499. The relationship is approximated to a certain degree as a direct proportion. The relationship is easy to evaluate by experimentation, and thus, knowing the diffuser concentration of an element allows evaluation of the photic dispersion density of core element 499, and vice versa.

As the height of core element 499 is reduced, power in the emanating light 402 reduces proportionately. The ratio of power of the emanating light 402 to the height of core element 499, which approaches a constant as the height of the element is reduced, is the emanated power density at core element 499. The emanated power density at core element 499 is the photic dispersion density times the power of the incoming light (i.e. power of light traveling through the element). The gradient of the power of light traveling through the core 304 is the negative of the emanated power density. These two relations give a differential equation. This equation can be represented in the form "dP/dh=−qP=−K" where:

h is the height of a core element from the primary light source edge 112;
P is the power of the light being guided through that element;
q is the photic dispersion density of the element; and
K is the emanated power density at that element.

This equation is used to find the emanated energy density given the photic dispersion density at each element. This equation is also used to find the photic dispersion density of each element, given the emanated energy density. To design a particular light source with a particular emanated energy density, the above differential equation is solved to determine the photic dispersion density at each core element of the core, such as core 304. From this, the diffuser concentration at each core element of a core is determined. Such a core is manufactured and used in a light guide, to give a light source of required emanated energy density over the surface of the light source.

If a uniform concentration of diffuser is used in the core, the emanated power density drops exponentially with height. Uniform emanated power density may be approximated by choosing a diffuser concentration such that the power drop from the edge near the light source (such as edge 112) to the opposite edge 114, is minimized. To reduce the power loss and also improve the uniformity of the emanated power, opposite edge 114 reflects light back into the core. In an alternate embodiment, another primary light source sources light into the opposite edge 114.

To achieve uniform illumination, the photic dispersion density and hence the diffuser concentration has to be varied over the core surface. This can be done using the above methodology. The closed form solution is q=K/(A−hK), where A is the power going into the core 104 and K is the emanated power density at each element, a constant number for uniform illumination. If the total height of the core is H, then H times K should be less than A, i.e. total power emanated should be less than total power going into the light guide, in which case the above solution is feasible. If the complete power going into the light guide is utilized for illumination, then H times K equals A, and thus the photic dispersion density q approaches infinity as h approaches H, i.e. for higher elements of core 504. In one embodiment of the present invention, H times K is kept only slightly less than A, so that only a little power is wasted, as well as photic dispersion density is always finite.

FIG. 5 illustrates a diagram of an exemplary light source in the form of a surface 500 with a core having a varied concentration of diffuser particles, according to one embodiment of the present invention. The concentration of the diffuser is varied from sparse to dense from the bottom of core 504 (primary light source edge) to the opposite edge of core 504.

FIG. 6 illustrates an exemplary light source in the form of a surface 600 having two primary light sources, according to one embodiment of the present invention. By using two primary light sources 108, 609, high variations in diffuser concentration in a core is not necessary. The differential equation provided above is used independently for deriving the emanated power density due to each of the primary light sources 108, 609. The addition of these two power densities provides the total light power density emanated at a particular core element.

Uniform illumination for light source 600 is achieved by photic dispersion density q=1/sqrt((h−H/2)^2+C/K^2) where sqrt is the square root function, ^ stands for exponentiation, K is the average emanated power density per primary light source (numerically equal to half the total emanated power density at each element) and C=A(A−HK).

FIG. 7 illustrates a diagram of an exemplary light source in the form of a surface 700 having a mirrored core, according to one embodiment of the present invention. By using a mirrored core 720, high variations in diffuser concentration in the core 720 is not necessary. Top edge 710 of the core 720 is mirrored, such that it will reflect light back into core 720. The photic dispersion density to achieve uniform illumination in light source 700 is:

$$q=1/\text{sqrt}((h-H)^2+D/K^2)$$

where D=4A(A−HK).

For any system of the present invention (such as the light sources in the form of surfaces 500, 600 and 700), the same pattern of emanation will be sustained even if the primary light source power changes. For example, if the primary light source of light source 500 provides half the rated power, each element of the core will emanate half its rated power. Specifically, a light guide core designed to act as a uniform illuminator acts as a uniform illuminator at all power ratings by changing the power of its primary light source or sources. If there are two primary light sources, their powers are changed in tandem to sustain this effect.

FIG. 8 is a flow diagram illustrating an exemplary core manufacturing process 800, according to one embodiment of the present invention. Diffuser particles are introduced into a base liquid at a homogeneous or varying concentration. (810) The base liquid is solidified into a transparent solid in a controlled way. (820) The transparent solid eventually forms the body of the core. Solidification is achieved by cooling the base liquid, or by polymerization, or by any similar physical or chemical means. (830) The solidifying process uses a controlled temperature or polymerization schedule, or other means such that the rate of physical diffusion of the diffuser in the base liquid is controlled as a function of time. It is possible that the diffuser material also undergoes physical and chemical change during the process. During solidification, the diffuser particles undergo migration due to physical diffusion and in alternate embodiments, due to buoyant force, convection, non-uniform diffusion rates, and other forces. (840) The base liquid is solidified into the core with a predetermined location-dependant concentration of the diffuser. Optionally, more diffuser material or base liquid may be introduced throughout this process. (850)

Figure 9A:
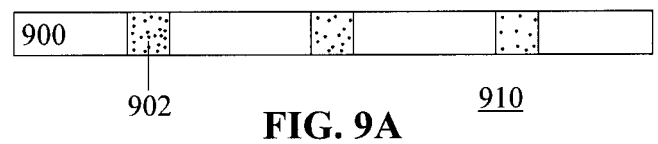
FIG. 9A illustrates a block diagram of an exemplary base liquid having varying concentrations of diffuser particles, according to one embodiment of the present invention.

FIG. 9A illustrates a block diagram of a base liquid 910 having varying concentrations of diffuser particles, according to one embodiment of the present invention. Base liquid 910 includes diffuser particles 902 of different concentration levels. The diffuser particles 902 are added at different locations of the base liquid 910, which is kept in a rectangular tray of the same size as or larger than the core to be produced. The locations in which the diffuser particles are added may be of same or varying sizes. Although only three areas of diffuser particles are shown in base liquid 910, hundreds or even millions of such areas may exist over the surface of the base liquid 910. The base liquid 910 is then solidified in a controlled manner to form a core such as 304.

Figure 9B:
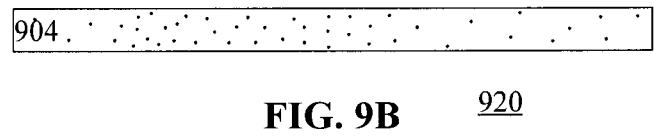
FIG. 9B illustrates a block diagram of an exemplary core, according to one embodiment of the present invention.

FIG. 9B illustrates a block diagram of an exemplary core 920, according to one embodiment of the present invention. During the process of solidification, the areas of diffuser particles undergo physical diffusion into each other and into the base liquid to form a continuous gradation in the diffuser concentration having a predetermined diffuser concentration pattern. If the tray is larger than the required core, the core sheet is cut out of the sheet that is thus formed.

To design the diffuser particle areas, a physical diffusion process is approximated as a linear, location invariant system, namely a convolution operation. The diffuser particle areas are designed close together, and in such concentrations that the final concentrations after the convolution have the predetermined pattern. This may be done by deconvolution. According to one embodiment, the impulse response of the convolution operation, necessary to perform the deconvolution, is identified experimentally, or using the knowledge of the temperature schedule, or other controlled solidification process used. Because of non location-invariance at the edges, a linear but not location invariant model may be used in another embodiment. The particle concentrations of the diffuser particle areas is then calculated using linear system solution methods, including matrix inversion or the least squares method.

In one embodiment, the diffuser particle areas of varying diffuser concentration are introduced into the base liquid 900 by nozzles, each nozzle ejecting a diffuser solution of a different concentration or amount, or for a different amount of time. In another embodiment, the diffuser particle areas are made by injecting the diffuser through holes of variable size made in a tray containing diffuser material.

Figure 9C:
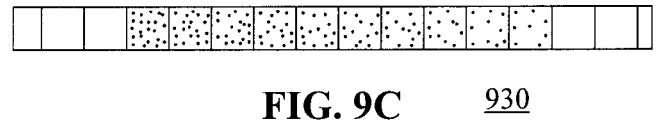
FIG. 9C illustrates a block diagram of an exemplary base liquid having compartments, according to one embodiment of the present invention.

FIG. 9C illustrates a block diagram of an exemplary base liquid 930 having compartments, according to one embodiment of the present invention. The base liquid itself is introduced into the setting tray in the form of parts having varying concentration of the diffuser. These parts might be initially separated using partitions, as shown in FIG. 9C. The partitions are removed after all the parts are ready. These parts then undergo physical diffusion into each other as the base liquid solidifies, to produce a continuous gradation of diffuser concentration.

The above processes (or the ones specified hereinafter) need not be executed in a tray of the form of the final sheet. For example, a whole three dimensional block could be processed at a time and sheets could be cut out of it. Alternately, these processes could take place one after the other on a conveyor belt, with a continuous sheet being formed, which is eventually cut into sheets of the required size. In the case of solidification due to temperature (freezing), various locations of the conveyor belt will have precisely controlled temperature.

In another embodiment, the solidifying sheet of base liquid is in contact on two sides with reservoirs of base liquid with different concentrations of diffuser. A gradient of diffuser concentrations is created across the base liquid. Over a time period, the physical diffusion process settles and a linear gradient is formed. Shorter time periods give different kinds of gradients for particular applications, and to approximate uniform lighting conditions.

In another embodiment, a homogeneous mixture of the base liquid and diffuser is made. As the base liquid solidifies, the sheet is kept at an angle. Depending upon whether the diffuser particles are heavier or lighter than the base liquid, they will migrate upwards or downwards under the force of gravity and buoyancy, and thus form a gradation of diffuser concentrations. The angle of the sheet is varied throughout the process in a controlled fashion.

FIG. 10 illustrates a block diagram of a base liquid 1000 with a light source 1010, according to one embodiment of the present invention. An extended light source 1010 projects light energy from one end onto base liquid 1000 with a small amount of diffuser in it. The light from light source 1010 is of a wavelength that is absorbed by the diffuser. The diffuser particles at a particular location receive radiated heat proportional to the photic dispersion density at that location multiplied by the power of radiation that reaches that point. There is even heating of the diffuser particles when the received heat is a constant. This equilibrium state is the same diffuser concentration gradation used for uniform illumination. If this equilibrium state is not achieved, there is preferential heating up of the diffuser particles, and the surrounding base liquid. This causes variations in the physical diffusion rate, which causes the diffuser particles to migrate until equilibrium is achieved. The power of the light source 1010 may be reduced, until base liquid 1000 solidifies. For evenness in radiated heat, light source 1010 is an evenly illuminated surface.

In another embodiment, the temperature of various locations in the base liquid 1000 are controlled using temperature control mechanisms. A feedback system (not shown) senses the present concentration of the diffuser, and adjusts the temperature to achieve the required concentration. The present concentration may be sensed by passing light through the forming core, and by sensing the emanated light density.

In another embodiment, the linear nature of the concentration pattern is achieved by setting up a gradient between reservoirs. Corrections for the non-linear nature of the concentration pattern are achieved by adding diffuser particle areas of varying diffuser concentration. These diffuser particle areas undergo physical diffusion at the same time that light source 1010 creates microscopic temperature gradients for very small scale corrections.

FIG. 11A illustrates a light source 1100 that emanates light from a single surface, according to one embodiment of the present invention. Light guide 1100 includes a mirror 1102 on one side. To avoid specular reflections from the mirror 1102, in one embodiment the mirror 1102 has a glazed or brushed appearance. In another embodiment, a light diffusing sheet or film is added between the mirror 1102 and the rest of the apparatus 1110, or immediately after the output cladding sheet. The mirror 1102 might be a partially silvered mirror, so as to let some light through it and objects on the other side may be viewed. This apparatus may be used as one-way glass. The system may also be used for photography purposes, such that the illumination is from the same direction as the camera.

FIG. 11B illustrates a block diagram of an exemplary light guide 1120 that emanates light from a single surface, according to another embodiment of the present invention. In this embodiment, only one cladding sheet 1106 is used and the core is mirrored 1104 directly.

According to another embodiment, it may be desired to place a camera or similar device behind the light guide. However if the light guide includes a mirror, it makes the backlight opaque, so that a camera may not view through it. FIG. 11C illustrates a block diagram of an exemplary light guide 1140, with a horizontal strip left unmirrored, according to one embodiment of the present invention. To compensate for the loss in illumination power in this part, a larger concentration of the diffuser is used in the area 1107 in front of the unmirrored strip. To achieve evenness of illumination from various angles of viewing, a continuous gradation in the reflectivity of the mirror is matched by a continuous gradation in the diffuser concentration that also matches the illumination power loss due to the reduced reflectivity of the mirror. This gradation in the reflectivity of the mirror is such that in the area utilized by the camera to view through the backlight, the mirror is completely or primarily transparent.

FIG. 12 illustrates a light guide 1200 allowing illumination with more than two colors, according to one embodiment of the present invention. Light guide 1200 also allows emanation of special light patterns. One or more light guides 1201 are placed next to each other. Since each light guide is transparent, illumination due to all the light guides is visible on the surface. Various illumination effects may be achieved in this way. Each of the primary light sources 108 has a specific spectrum of emanation. The power of each primary light source may be controlled separately. The viewable surface 1202 of light source 1200 is a light source of changeable color. A lens system or other optical arrangement may be used to produce a focused beam, which creates a luminaire of varying color, which is very energy efficient, and can produce a continuous gradation of color, and also continuous changes of color.

Because of the small thickness of the core, almost all the light entering the light source through its large surface passes through the light source without modification. Thus, the light source is primarily transparent to transverse light.

One use of the present apparatus as a source of illumination in homes, offices, factories, for photography, etc. and as a laboratory source of light.

Another use of the present apparatus and method is as a backlight for flat panel displays such as LCD screens. Such screens are commonly used in laptop and desktop monitors, and the backlight of the display is a uniformly illuminated surface.

According to another embodiment, non-uniform emanation of light may be preferred. A light with a gradation of color (hue, saturation, luminance or the spectrum in general) may be achieved, using a system having two primary light sources that have two different colors. This system is more energy efficient than systems using color filters.

The present apparatus can be used for architectural and civil lighting (including home, office and public spaces), for photography including medical photography, and for cinematography and theater. Uniform light sources are also useful as standard light sources for calibration and laboratory purposes.

The transparency of the present apparatus allows a photographer to photograph an object from behind the light source, giving shadowless photos, which are of special importance in medical (especially orthodontic) photography. A camera may capture an image from behind a lighted flat screen display having a backlight comprising the present apparatus.

The present apparatus and method may also be used for aesthetic and artistic purposes. For example primary light sources of different colors at two opposing edges of the light guide provide a light source with a continuous gradation in hue. A specific application of such an appliance may be made as the cyclorama or sky-cloth in theatre and movie productions, to simulate the gradation of hue in the sky. Various other gradations in luminosity and hue may be achieved.

According to another embodiment, the present apparatus and method replaces daylight with an artificial light source from the same direction. Automatic compaction is also provided since separate space is not needed for a daylight aperture and for an artificial light source. Another embodiment provides privacy when required as the transparent surface becomes a light source that obscures the view through it. Similarly, a half-mirror or one-way-glass may be augmented by a transparent light source on one end of the half-mirror, making it hard to view objects in one direction, and easy to view them in the opposite direction.

An apparatus and method for providing a light source in the form of a surface has been described. It is understood that the embodiments described herein are for the purpose of elucidation and should not be considered limiting the subject matter of the present patent. Various modifications, uses, substitutions, recombinations, improvements, methods of productions without departing from the scope or spirit of the present invention would be evident to a person skilled in the art.

We claim:

1. An apparatus comprising:
a first sheet including a distribution of light diffusing particles; and
a light source placed along an edge of the first sheet; wherein,
the first sheet diffuses light generated by the light source such that the light emanates from a surface of the first sheet,
there is a continuous gradation in the concentration of light diffusing particles,
the first sheet and the light source together provide a light emanating surface that allows light sent into a large face of the first sheet to almost completely pass through without being dispersed,
the concentration of light diffusing particles is so small that if the first sheet is viewed along its narrow dimension, it seems almost completely transparent, while when viewed along its longer dimension, a much larger visual concentration of the light diffusing particles is observed, and
the concentration of light diffusing particles at each location is varied in inverse proportion to the difference between a constant and the distance of the location from an edge of the first sheet.

2. An apparatus comprising:
a first sheet including a distribution of light diffusing particles; and
a light source placed along an edge of the first sheet; wherein,
the first sheet diffuses light generated by the light source such that the light emanates from a surface of the first sheet,
there is a continuous gradation in the concentration of light diffusing particles,
the first sheet and the light source together provide a light emanating surface that allows light sent into a large face of the first sheet to almost completely pass through without being dispersed,
the concentration of light diffusing particles is so small that if the first sheet is viewed along its narrow dimension, it seems almost completely transparent, while when viewed along its longer dimension, a much larger visual concentration of the light diffusing particles is observed, and
the concentration of light diffusing particles at each location is varied in inverse proportion to the square root of the sum of a constant and the square of the difference between a constant and the distance of the location from an edge of the first sheet.

* * * * *